Figure 1:
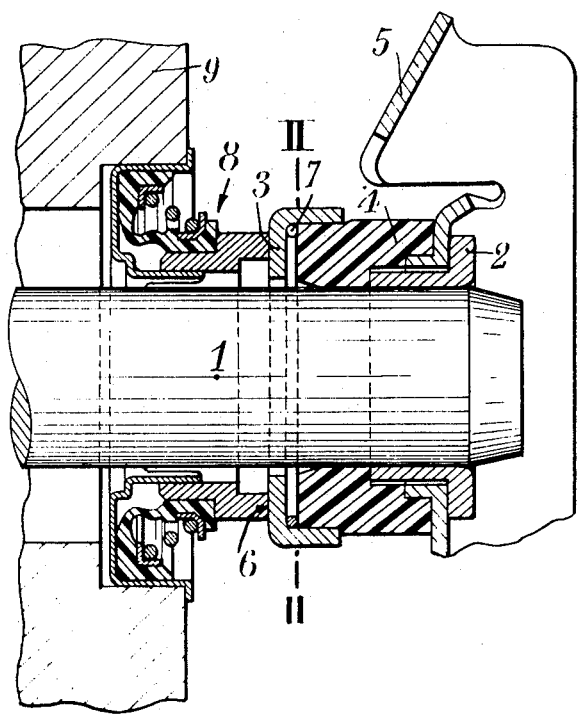

United States Patent
Mincuzzi

[15] 3,663,026
[45] May 16, 1972

[54] IMPELLER FOR SMALL-SIZE PUMPS
[72] Inventor: Antonio Mincuzzi, Midland, Italy
[73] Assignee: Societe Internationale De Mecanique Industrielle S.A., Luxembourg, Luxembourg
[22] Filed: July 9, 1970
[21] Appl. No.: 53,528

[30] Foreign Application Priority Data
July 29, 1969 France..................................6925889

[52] U.S. Cl..............................277/237, 277/81, 415/17 A
[51] Int. Cl.................................................F16j 15/34
[58] Field of Search....................227/237, 81, 92; 415/17 A

[56] References Cited
UNITED STATES PATENTS
2,835,515  5/1958  Solari..................................277/92 X

*Primary Examiner*—Robert I. Smith
*Attorney*—Robert E. Burns and Emmanuel J. Lobato

[57] ABSTRACT

An impeller of the type broadly set forth hereinafter which is capable of transmitting electric current between the impeller shaft and the friction disk frictionally engaged by shaft seal or packing. Now this possibility is particularly advantageous when it is contemplated to control an electromagnetic device rigid with the shaft. In this case, the electric control current must flow to the shaft via the packing and the friction ring supported by the resilient member consisting generally of insulating material.

4 Claims, 4 Drawing Figures

PATENTED MAY 16 1972    3,663,026

IMPELLER FOR SMALL-SIZE PUMPS

This invention relates to impellers of small-size pumps and has specific reference to those intended for circulating cooling water of automotive vehicles, these impellers comprising as a rule metal members assembled by means of resilient members consisting as a rule of rubber or plastic material.

It is the essential object of this invention to provide an impeller of the type broadly set forth hereinabove which is capable of transmitting electric current between the impeller shaft and the friction disk frictionally engaged by the shaft seal or packing. Now this possibility is particularly advantageous when it is contemplated to control an electromagnetic device rigid with the shaft. In this case, the electric control current must flow to the shaft via the packing and the friction ring supported by the resilient member consisting generally of insulating material.

To this end, according to a specific form of embodiment of the present invention, a suitable shaped resilient clip is fitted to the shaft and engages same with its central portion, the peripheral portion of said clip engaging the friction ring assumed to be electrically conductive.

Figure 2:
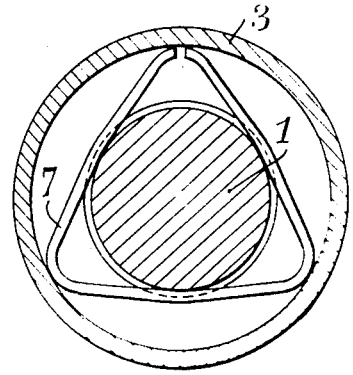
Figure 3:
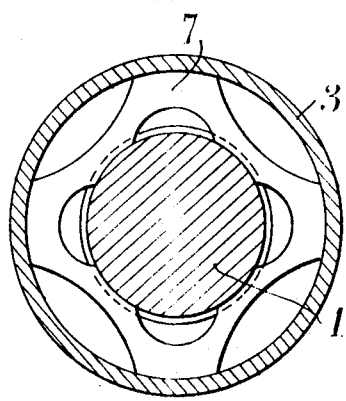
Figure 4:
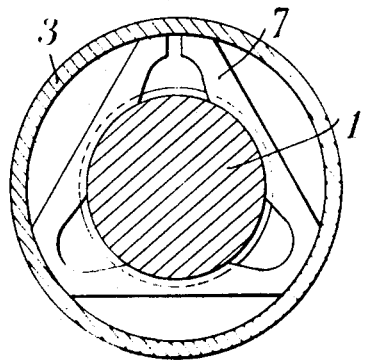

The attached drawing illustrates diagrammatically by way of example several exemplary forms of embodiment of this invention. In the drawing:

FIG. 1 is a longitudinal section showing the mounting of an impeller according to this invention on a driven shaft within a pump body; and, FIGS. 2 to 4 are cross-sections taken along the line II—II of FIG. 1 and showing three different forms of embodiment of this invention.

Force-fitted to the outer end of the pump shaft 1 mounted in the pump body of which one portion of the wall 9 is shown in FIG. 1 is a metal member 2 rigidly connected through a resilient member 4 to the friction disk 3, the pump blading 5 being secured in any suitable manner to said metal member 1; the friction disk 3 comprises a friction face 6 which must preserve the perfectly true and smooth condition imparted thereto by the original lapping operation.

A shunt-forming resilient clip 7 is fitted to the shaft 1 and engages the latter with its central portion, the periphery of said clip being in elastic contact with the friction disk 3; the clip 7 may consist of a metal wire bent to a triangular shape, as shown in FIG. 2, or alternatively of a thin, suitably punched disk as shown in FIG. 3, although a split pressed disk of the type shown in FIG. 4 may also be used.

It is shown in the Art that any substantial stress exerted on the friction disk 3 may be a cause of detrimental distorsion on the friction face 6 thereof; in fact, a perfectly true friction or working face 6 is necessary for ensuring a good fluid-tightness with the seal or packing 8 urged for frictional engagement therewith; the insulating elastic member 4 supports the friction disk 3 while exerting a minimum, uniformly distributed pressure thereon; due to the specific shape and resiliency of the shunt-forming clip 7 prevents any appreciable additional stress from being exerted on the disk 3.

Of course, the specific forms of embodiment illustrated and described herein should not be construed as limiting the scope of the invention since they are given by way of example only; therefore, many modifications and changes may be brought thereto without departing from the spirit and scope of the invention as set forth in the appended claims.

What is claimed is:

1. A fluid-tight seal disposed between a rotary shaft and a fixed wall through which said shaft is caused to extend for penetrating into a chamber bounded by said wall, which comprises a fixed element consisting of an annular metal case secured to said wall, a friction ring of electrically conductive material, a resilient membrane interconnecting said ring and case in a fluid-tight manner, a concentric helical spring constantly urging said friction ring away from said metal case, and an electrical connection between said case and said ring, on the one hand, and a rotary assembly comprising a metallic friction disk against which said friction ring is resiliently pressed by said spring and which has no direct contact with said rotary shaft, a metal member force fitted on and revolving bodily with said shaft, a resilient member of electrically non-conductive material interposed between said metal member and said metal disk, for rotatably driving said metal disk from said rotary shaft, on the other hand, and a resilient metal clamp inserted between said resilient member and said friction disk, said clamp having a central portion adapted to clamp said rotary shaft and a peripheral portion engaging said disk in order to provide an electrical contact between said fixed wall and said rotary shaft.

2. A fluid-tight seal as set forth in claim 1, wherein said metal clamp consists of a resilient wire of substantially triangular configuration having its two ends converging towards each other at one apex.

2. A fluid-tight seal as set forth in claim 2, wherein said metal clamp consists of a relatively thin disk cut to a suitable configuration.

4. A fluid-tight seal as set forth in claim 3, wherein said thin disk is split along the bissectrix of one of its apices.

* * * * *